Sept. 28, 1965    E. FALLON    3,208,881
ACCUMULATOR PLATE
Filed June 22, 1964

INVENTOR
*Eduardo Fallon* by *Wenderoth, Lind & Ponack*

ATTORNEYS 3,208,881
ACCUMULATOR PLATE
Eduardo Fallon, Avenida Jimenez de Quesada 8–56,
Bogota, Colombia
Filed June 22, 1964, Ser. No. 381,283
3 Claims. (Cl. 136—78)

This application is a continuation-in-part of my application Serial No. 115,227, now abandoned, filed January 6, 1961, entitled "Accumulator Plate."

This invention refers to an accumulator plate applicable to lead-acid accumulators or to any other type, in which an ingredient is added to the usual components of the active materials, and which is intended to serve as a binder which binds the other ingredients of the active material. This binder can be added to the ingredients when the active paste is mixed, and it can also be applied to plates already manufactured by the current processes, by immersion.

This binder is inert, it does not enter into the electrochemical reactions, and is not an electrical conductor. Neither does it combine with electrolytes of applicable types. It is however highly resistant to strains, blows, movements or vibrations to which the accumulator might be subjected. Several binders have been successfully tried in experiments, such as: natural and synthetic resins, simple and compounded plastics, and various combinations of different types of natural and synthetic rubbers. All of these have been liquefied for application by means of solvents, heat or both. These have been combined with the active ingredients at the time of preparation of the active paste, being included with the corresponding solvent as an additional ingredient, the binder has also been applied to plates of current manufacture by impregnation of the finished plate. This is done by immersion, and it can be applied hot or cold. The impregnated plate is pressed between two faces and heated beyond the softening temperature of the binder, and these facts can be made to impress a design on the plate surface, as for instance, small bulges or buttons that will later serve to space the plates when the accumulator is assembled.

The binder in reference could not be used as described above inasmuch as it would insulate the particles of active material one from another and all from the grid, completely destroying such characteristics as porosity, permeability, and electrical conductivity which are essential to the electrochemical cycle of charge and discharge, but it can be used successfully, retaining at the same time all the desirable characteristics of porosity, permeability, electrochemical activity and electrical conductivity, by means of a complementary process which is described below.

Once the binder impregnated plate is formed, the characteristics referred to above are restored by subjecting the inert plate to electrical discharges of sufficient voltage to penetrate the inert insulating binder, at the surface and throughout the active mass in such a way that the necessary circuit is only completed when the current reaching the plate can overcome the electrical resistance it finds in its path, until it reaches the grid. This discharge creates a path of electrical conduction from active particle to active particle penetrating the intervening inert matter until it reaches the grid. As it is a characteristic of this type of discharge that it will follow a tortuous route to reach its objective, each discharge will cover a considerable distance, interconnecting a great number of particles, and as there are a great many thousands of discharges, we arrive at an interconnecting network of particles of active material that will include nearly all of them, connecting them one to another and practically all of them to the grid. Another consequence of an electrical discharge through a material such as this is that the current opens ducts or channels in its path by fusing a small proportion of the materials it encounters on the way, so that, also, an extensive network of capillary ducts is obtained along the same paths as the electrical conductors.

In the first place, a plate is formed by the active materials and an inert binder, which has ideal characteristics of resistance to impact, or erosion as well as great flexibility, which cannot be easily distorted, and in which the paste will not break away from the grid. This is achieved in accumulators of all types, during the mixing of the active paste, or by adding the binder by impregnation of the finished plate. Having done this, the plate is restored to its active characteristics by means of a very thorough perforation. The hard firm surface of the plates is also formed into special shapes, such as "tits" or nodules of such shape, number and height as will serve to establish and maintain the distance that must separate the positive from the negative plates. Spacer elements of suitable materials resistant to the action of the electrolyte may also be applied, which must also be good insulators and which will adhere firmly to the surfaces produced by the binder. Rubber has been successfully used for this purpose, which has the additional advantage of imparting elasticity to the group of plates compressing them into the battery case jars so that they are firmly secured, and kept in place by the natural tendency of the compressed rubber to expand.

As this plate has a hard firm surface, these spacers will stick firmly to it, so that we can stick the spacers to the plates, and the plates to the spacers on one side and the other in such a way that the negative and positive plates are stuck together in one homogeneous cellular block, instead of being independent negative and positive groups that slide freely over each other as is the case in the present day batteries. If we remember that in this plate, the grid is no longer required to support the active materials, but is instead, itself supported by the plate, which is a very strong structure, and if we add to this the fact that there is mutual support between negative and positive plates, as they are all glued into a single block, it is no longer possible for the positive grid to crumble into dust as the result of sustained overcharge.

In its dry form the perforated mass of this plate is not an electrical conductor, but it becomes an electrical conductor when its numberless pores and capillary ducts are impregnated with electrolyte. For this reason and due to the fact that this plate presents hard firm surfaces to which the small spacers can adhere firmly, in combination with the structural rigidity obtained by the integration of positive and negative plates into one rigid group in which there is no relative movement between elements, we are able to eliminate the separators which in existing present day batteries serve the double purpose of separating the positive and negative plates, as well as retaining the positive active material on the grid. In this plate, there is no tendency of the positive material to become separated from the positive grid. By eliminating the separators we increase the cubic space available for active ingredients, to such an extent that we can get two more plates and 35% more electrolyte in a Group No. 1 battery.

The primary function of the grid is to conduct electric current from and to an external source to the active material of the plate. A secondary function is that of supporting the active material. In the case of the proposed modification of the usual practice, the secondary function is assisted by the fact that the proposed film adheres to the surface of the plate, and that spacing elements can be made to adhere to this film, which would not adhere to the powdery friable surface of the plate now in use in existing commercial batteries. This makes it possible to unify the numerous plates of an element so that there is mutual support of the plates.

By eliminating the separators we also eliminate the current drop on heavy discharge which takes place when the electrolyte in the pores of the separators of the present day battery is weakened by discharge faster than it is renewed by filtration and osmosis. This weakened electrolyte increases the internal resistance of the present day batteries, thereby reducing the maximum discharge rate. In a battery fitted with these plates the situation is reversed, as a heavy discharge will produce a large flow of hydrogen which will in turn give rise to a strong circulation of electrolyte between the plates, renovating it at such a rate that there is no weakening in the critical area, by this means reducing the internal resistance, and increasing the cooling effect of the electrolyte.

To form this plate, whether by preparing the active paste and applying it to the grids, or by impregnating plates that have already been prepared, their thickness is not increased. Once the plates are assembled into groups of positive and negative elements, by separating them and uniting them by means of spacers, these groups are placed in the boxes of existing types, and from that point on, assembly is identical with the existing process.

Due to the extreme rigidity and resistance of the plate groups, as well as to the hard surface of the plates as well as due to the clear spaces between positive and negative plates, unobstructed by separators, it is possible to "hose" this battery by injecting a jet of water through the filling plugs while the battery is held inverted so that a flow of water is established. In this way any sediment may be eliminated that might have found its way in without any fear of clogging the space in the separator grooves, or eroding the paste away from the grids.

The advantages offered by this type of plate are available to the nickel, iron or cadmium and other types of batteries as well in which they improve upon the costly design by means of which the active materials are retained in these batteries, as for example in the Edison battery in which the active material is compressed in small metal capsules pressed into a costly frame.

In the drawings some non-limiting forms of the invention are shown.

The invention relates specifically to the "lead-acid" battery, and in such a battery the usual ingredients are as follows: basically—lead peroxide in the positive plate and metallic lead in sponge form in the negative plate, the durability of which is somewhat improved by adding such materials as will add to the mechanical resistance of the material in the positive plate (lead peroxide) and to the porosity and permeability of the sponge-lead in the negative plate. Some of the ingredients used for this purpose are pumice stone, plaster of Paris, binders such as asbestos fibre, barium sulphate and lamp-black in the negative plate and others.

Preferably a surface film is used of a material as follows:

A mixture of equal parts of polystyrene and neoprene is dissolved in xylol. On occasion the proportions of these ingredients have been varied and have been quite successful with trichloroethylene as a solvent. Other plastics such as polyvinyl chloride and epoxy have been used successfully as has neoprene alone.

The inert, non-conducting substances are the plastics and the neoprene above. These are polystyrene, and neoprene dissolved in xylol.

Figure 1:
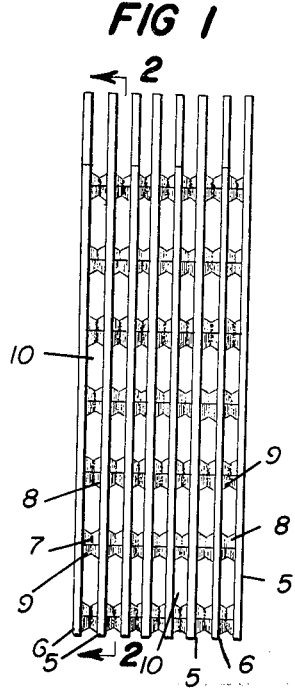
FIGURE 1 is a side view of battery plates constructed according to the invention.

In FIGURE 1 the negative plates are indicated at 5 and the positive plates at 6. The points of contact at which the projections are fused together is shown at 7 and the projection integral with the negative plate is indicated at 8 while the projection integral with the positive plate is shown at 9. The space for the circulation of the electrolyte is indicated at 10.

Figure 3:
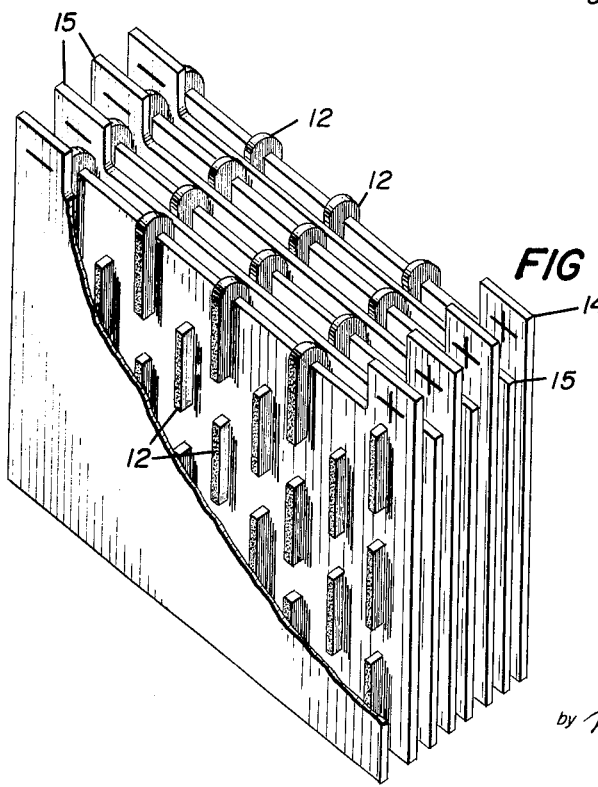
FIGURE 3 is a perspective view of another form of the invention.

In FIGURE 3 the spacers upon the plate are indicated at 12 and such spacers are resistant to the electrolyte and are cemented to both the positive and negative plates. The spacers 12 can have any other desired shape and may be made of any suitable material that is resistant to the electrolyte.

The spacers may also be formed from the same material with which the plate is impregnated. They may be formed integrally with the plate. The spacers may form part of the positive or the negative plate and may be located on one side only or upon both.

On assembly of the elements the spacers and plates are all cemented to each other to be able to form a solid cellular structure.

Figure 2:
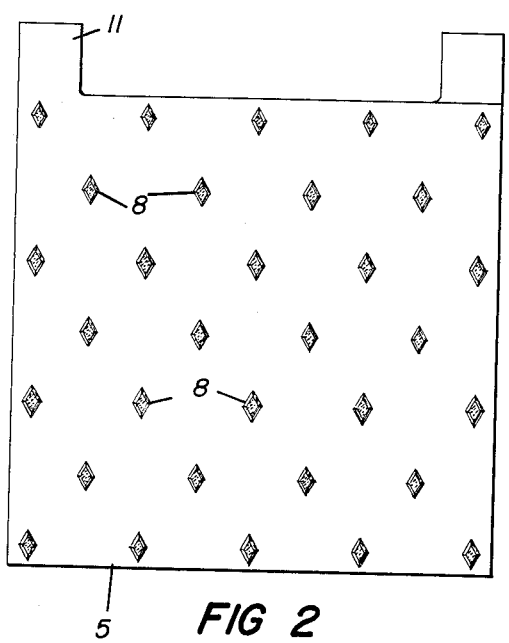
FIGURE 2 is a front view of one plate.

The lug terminal of a plate is indicated at 11 in FIGURE 2 while in FIGURE 3 the positive plates are indicated at 14 and the negative plates at 15.

The invention separates positive and negative plates of two halves of an element by means of protuberances or tits which are insulators.

The protuberances or "tits" directly act as electrical separators or insulators establishing and maintaining the required distance between components of opposite polarity within the element.

The insulating protuberances or tits on plates of opposite polarity are fused to each other, guaranteeing and assuring the insulation of one plate from another.

A plastic mass is formed in which materials such as polystyrene or rubber are combined with the active ingredients. This plate hardens to the point of virtual indestructibility. In this plate the active ingredients are the fillers, the plastic or rubber material is the agglutinant, and there is no sulphation in the process of formation. No additional elements such as separators are required to retain the active material. Porosity and electrochemical activity are restored or restituted to the hard plate of plastic material, except at points where numerous protuberances or "tits" are formed in the plate. These "tits" act as spacers and a free circulation of electrolyte is provided.

The invention utilizes a process of agglutination different from the usual sulphation, in a combination where the active material will not be called upon to provide cohesion and mechanical strength. By this means there is achieved for the first time a really strong plate that will not be any thicker, and which will not need a filler of inert material, and will not require an outside layer of retaining material, or a separator, either to insulate the plates of opposite polarity or to retain the active material.

The invention forms a block in which the positive and negative plates are united at the point of contact of protuberances or "tits" which serve as spacers, thereby rendering them practically indeformable and eliminating warping.

The active materials of the invention are combined with an agglutinant composed of plastics or rubber made liquid by heat or by suitable solvents. The active material acts as a filler and for the first time in lead-acid batteries, not as an agglutinant. It is not combined with an acid, and no sulphation enters into the preparation of the active paste. The plate is permitted to harden to the point of virtual indestructibility, and a suitable number of protuberances or "tits" are formed of the same material and evenly distributed over the entire surface of the plates. These act as spacers.

The porosity and electrochemical activity are restituted to this mass of plastic concrete by perforating it. These perforations are produced by innumerable discharges of high-tension electricity which must enter at the surface and reach the grid in order to complete the circuit for each discharge.

In flowing from the surface to the grid these high-tension discharges follow a circuitous route, they perforate the plastic in their path and unite the conductive material in innumerable tiny chains of fused metal. All of these discharges inevitably complete this process to the grid, they however evade or avoid the protuberances or "tits" where the distance to the grid is greater, and these "tits" are therefore nonconductors.

Conductivity is established by means of the electrolyte which permeates the capillary ducts but there is no metallic short circuit if the plates of opposite polarity come in contact with each other, or if particles of metal are interposed between them.

The elements are wedged in the jars under pressure, which is maintained in service by the employment of elastic shims. None of the internal elements are cemented, or caused to adhere to the case, or secured to the case by anything other than friction or pressure. In this invention the positive and negative plates are fused to each other at the point of contact of numerous protuberances or "tits" which act as spacers. These "tits" are evenly spaced over the entire surface of the plates. The plates so united form a single element composed of positive and negative plates separated at a convenient distance by the aforementioned "tits" which act as spacers. In the process the plates can, if necessary or convenient, be formed into the single cellular block, forming the spacing "tits" and leaving suitable space for the circulation of electrolyte without any process involving the cementing together of any two independent surfaces. This last point eliminates any similarity in principle with any process for uniting elements and case by means of adhesives.

The invention is designed to avoid warping as distinct from chafing and to cause the negative plates to support the positive plates, which is desirable in view of the fact that the positive grids deteriorate with overcharge and become friable, while the negative plates tend to become harder and firmer with time. Also, to eliminate the disadvantages associated with separators by eliminating the separators and in addition to achieve a rigidity of structure in the element quite independent of the case, so that the element composed of positive plates and negative plates, and which uses no separators, is self-supporting, rigid, and undeformable before being introduced into the case, and before bridges and connecting bars or binding posts are burned to the lugs, and independently of these.

The invention produces a practically indestructible mass in which the filler is the active material and the bond or binder is a plastic. The grids are pasted with this paste, or alternatively, conventional plates are impregnated in plastic to a greater or lesser depth or throughout as desired. This plastic is caused to form protuberances or "tits" which act as spacers. The positive and negative plates can be cemented, fused or welded at the point of contact of these "tits," or alternatively the spacing and impregnation can be simultaneous, so that the element is fused into one cellular structure initially, eliminating the need of cementing or fusing one plate to another. The plates, and the "tits" are nonconducting, and every particle of active material is at this stage isolated and insulated in plastic, but then the invention proceeds to restitute the electrochemical activity, the porosity and the conductivity of the plate (conductive only in the presence of electrolyte) by showering it with high tension sparks that penetrate the surface except at the "tits" where the plastic is much thicker, creating innumerable capillary ducts and chains of metal particles fused to each other and reaching in every case from the surface to the grid.

The present invention described above refers to active plates or electrodes and not to separators. The battery described above does not use separators. The protuberances or "tits" spaced evenly over the surface of the plate, are formed integrally with the active plate and act as spacers and do not serve to center the plates.

The invention does not use or need separators, as the material cannot fall away from the grid, and cannot form trees, nor is the plate a conductor at the surface except through the electrolyte.

It is the purpose or object of the present invention to produce an integral block of indeformable plates, in which the active material is practically indestructible and in which the positive grids which might become friable as the result of overcharge, will be sustained by the active material and by the adjacent negative plates.

It is also the object of this invention to gain additional space for the active materials such as for example; the electrolyte, by eliminating the bulky separators, and to provide a much better circulation for the electrolyte by means of spacers evenly distributed over the entire area, as distinct from separators. It is not a function of these components to center the plates but only to establish distance between the plates of opposite polarity.

There are no separators in the present invention. There is no need to retain paste onto the grid as the active material is a firm, rigid mass formed of a plastic, or rubber as a binder, combined with the active oxides as a filler. The porosity of this mass is restituted by means of numerous high-tension discharge which burn capillary ducts from the surface of the plate to the grid in every case, causing the fusion of particles of active material in their path and forming conductors for an electric current as well as capillary ducts. Protuberances of "tits" can be formed on these plates by the active material itself, and due to their height or to put it another way, due to the additional thickness of the plates at the point where these protuberances or tits are formed, the electric spark which is used to perforate these plates will evade them, perforating only the flat surface of the plates. Positive and negative plates can be fused together at the point of contact of these "tits" of spacers.

The whole element can be assembled integrally leaving space alternated with spacing matter, so that actual tits or protuberances would not have been in existence at any time. There is no additional inert bonding impregnation, but the actual active material is simultaneously and integrally composed of a filler and a binder in its entire mass or entire area, and porosity is later produced by electrical perforations. This is therefore a composition and not an impregnation.

With respect to the invention an indeformable grid is not provided and is not required. A conventional grid is used which can be as thin as desired, and which is composed of the usual lead alloy.

The active material, however, is novel, in that it is a very strong mass in which the active material is a filler and a plastic substance or rubber is used as a binder. The invention sacrifices all other characteristics at this stage, in order to make an indestructible plate in which disgregation of active material and formation of sediment as well as "treeing" are not possible. Projections or "tits" are formed on the surface of this plate, and the projections are integral with the active material of the plate which at this stage is not a conductor, and they are not integral with or in any way connected to the grid. These projections or "tits" are numerous. These projections or "tits" are evenly spaced over the entire surface of the plate. These projections are fused to each other at the points where the projections on the positive plates meet the projections on the negative plates. No sliding motion is possible at the points of contact. These "tits" can be moderately elastic, making it possible to introduce the element into the cell jar in a compressed state so that a positive expansive pressure produced by the projections or tits will fix the element in place in use.

By fusing the positive and negative plates of the element to each other at the numerous points where the projections or "tits" make contact there is achieved a homogeneous cellular structure which is geometrically indeformable without recourse to bulky, inert, rigid grids.

The invention produces an active material, compounded in such a way that it cannot disgregate or become separated from the grid to form sediment and produces an active material which is so strong that, instead of being supported or sustained by the grid, it will itself support the grid to such an extent that the positive grid when made friable by overcharge will retain its form within this firm mold of concrete.

The projections of this material which is non-porous and non-conducting at this stage will act as spacers. These projections formed integrally on the surface of these plates and evenly spaced over the entire area will make it possible to assemble the element into an indeformable cellular structure when the positive and negative plates are fused together at the point of contact of these projections thereby obliging the negative plates in to them using trichloroethylene mixed with a commercial rubber solvent.

After this treatment both groups were perforated using in various pairs of plates voltages and currents ranging from 45,000 volts at 10 milliamperes, to 4,500 volts at 100 ma. This perforation was effected by placing the prepared plates on an iron grill, connecting the said grill to one pole of the high-tension transformer, and the other pole of the high-tension transformer to a wire brush which was passed numerous times over each face of the plate. This produces a brush discharge which produces an infinite number of perforations, each of which must reach the grid to complete the circuit.

After the perforation process all plates were "formed" into negatives and positives by the usual electrolytical process. Test groups were made of these, and identical test groups were formed of ordinary commercial plates of the same dimensions for control purposes, the results were as follows: (for the various types of plates which were tried and are claimed)

|  | Square Centimeters of Positive plate per Ampere/hour capacity | Square Centimeters of Positive surface per Amp. Maximum Discharge |
|---|---|---|
| Usual commercial plate | 12 cm.$^2$ of Pos. Plate per Ah | 6.5 cm.$^2$ juxtaposition per Amp. |
| Saturated Plastic and Lead-Oxide concrete. | 18 cm.$^2$ of Pos. Plate per Ah | 6.5 cm.$^2$ juxtaposition per Amp. |
| Integral mass having partial saturation (15%). | 16 cm.$^2$ of Pos. Plate per Ah | 8.0 cm.$^2$ juxtaposition per Amp. |
| Deep saturation of Commercial plate by immersion. | 16 cm.$^2$ of Pos. Plate per Ah | 9.0 cm.$^2$ juxtaposition per Amp. |
| Surface saturation by immersion plus heat and pressure. | 13.2 cm.$^2$ of Pos. Plate per Ah | 7.5 cm.$^2$ juxtaposition per Amp. |
| Plastic filaments in usual mix plus surface treatment plus heat and pressure. | 14 cm.$^2$ of Pos. Plate per Ah | 8.0 cm.$^2$ juxtaposition per Amp. |
| Integral mix, discontinuous film, 8% saturation, no electrical perforation. This was infracted. | 28 cm.$^2$ of Pos. Plate per Ah | 15.0 cm.$^2$ juxtaposition per Amp. | this homogeneous structure to provide support for the more vulnerable positive plates.

In the invention the grids are pasted with a putty-like mixture of the active metals and oxides which have been combined with a plastic material in a liquid state (or with rubber). The plates so pasted are compressed and heated between plates on the surface of which truncated cones have been countersunk. These form the projections that act as spacers. The porosity, capillarity, conductivity and electrochemical activity are restituted to this plate by causing numberless high-tension discharges to pass from the surface to the grid over all the area. These discharges form innumerable ducts and chains of fused particles where they meet lead or plastic in their path. The plate is a conductor only when the electrolyte permeates all the capillary ducts. The sparks do not jump at the projections where the distance to the grid is greater, the circuit longer.

*Example of plate formed of saturated plastic and lead-oxide mass*

A liquid having the consistency of cream was formed by dissolving polystyrene in trichloroethylene. Finely divided lead-oxide was added to this liquid and mixed until it acquired the consistency of putty. "Standard" grids were pasted with this, resulting in plates having the following dimensions: 124 mm. x 143 mm. x 1.6 mm. These plates were separated into groups, one of which was further hardened by heating under pressure between iron plates. The pressure represented a total force of 150 lbs. per plate, the temperature was 150 to 180° C. Small depression in the iron plates served to form 49 "tits" or protuberances on either or both sides of the positive plates. These are meant to serve as spacers, as this plate does not use a separator.

The plates in the second group were allowed to dry, or "set" without heat or pressure. In the case of the second group no "tits" or protuberances were formed, but small bits of rubber 2 mm. x 2 mm. x 2 mm. were stuck

*Integral mass having 15% saturation*

The usual paste was allowed to harden into lumps which were crushed into a coarse powder of about 15 mesh. This was mixed with 15% of liquid plastic by weight, and grids were pasted with this coarse mix. After setting this plate was surface treated with plastic, heat and pressure. The remaining process was identical with process previously described.

*Deep saturation of commercial plate by immersion*

Commercial plate was immersed successively in three plastic solutions, the first being very watery, the second having the consistency of cream, and the third having the consistency of treacle (or syrup). Some of these plates were also treated with heat and pressure, others were merely allowed to set. Beyond this the process was as already described.

*Surface saturation by immersion+heat+pressure*

These were commercial plates immersed in liquid polystyrene having the consistency of treacle or syrup, and treated with heat and pressure. The remaining treatment was as described above for "Saturated Plastic and Lead-Oxide Concrete."

*Plastic filaments in usual paste+surface treatment with plastic, heat, and pressure*

The usual paste was mixed, and liquid plastic was sprayed into the mixture by means of a compressed air paint spraying pistol. This was done from such a distance that the filaments of plastic were solidified in mid-air, entering the mixture dry, insoluble filaments. Grids were later pasted with this mix. The resulting plates were immersed in liquid plastic, and treated on the surface with heat and pressure. This produces surface film that is anchored to the plastic filaments encrusted in the paste. These filaments do not reduce the porosity of the paste and the whole is perforated by means of electrical discharges as already explained.

Conclusions (a) The saturated mass is by far the strongest plate, much more so than is actually necessary or commercially practical.
(b) Mix including plastic filaments and surface treatment are nearly as strong as above, but more effective electrically, and cheaper to produce.
(c) In all cases it is practical to paste the positive and negative plates to each other by means of the spacers, forming multicellular, indeformable blocks.
(d) There is no sediment whatever.

To maintain a predetermined distance between positive and negative plates distances of 3 millimeters have been used. One of the advantages of the battery lies in the fact that greater distances where space permits can be used, whereas other batteries are limited to a distance corresponding to the thickness of the commercial separators available.

A specific description for manufacturing the battery of this invention is given below illustrating a preferred method of constructing the same and which should not be construed in any limiting sense.

(1) A grid is cast from an alloy consisting of 90 parts of pure lead and 10 parts of antimony.
(2) Balls are cast from pure lead and put into a rotating cylinder where they are converted into lead oxide in the form of a fine powder.
(3) This oxide is placed in a mixer where it is combined with diluted sulphuric acid at a density of 1,100 sp. gr. (specific gravity). The result of this process is a paste.
(4) This paste is applied to the grid, and the resulting plate is allowed to cure for 72 hours during which the paste sets.
(5) The plates are dried in a flash oven.
(6) The raw plates thus formed are placed in numerous tanks where they are connected to a source of direct current with a potential difference of 2.9 volts per pair of adjacent plates and current is made to flow at the rate of 2 amperes per pair of plates (size of plates 143 x 135 mm.).
(7) The electrolytic process thus produced is continued for 48 hours and the electrochemical process converts the lead oxide of the positive plate to lead peroxide (PbO to $PbO_2$). The lead oxide of the negative plate is converted to metallic lead in sponge form (PbO to Pb).

The above steps are standard procedure for a manufacturer of lead-acid batteries.

(8) The plates are dried in the flash oven and while still hot (at a temperature of 80° C.) a mixture of equal parts of polystyrene and neoprene which have been dissolved in xylol is applied to them with a brush. This forms a film which penetrates into the plate only just enough to adhere firmly.
(9) A cord of rubber about 3 mm. in thickness is formed by extrusion and cut into lengths of 3 mm. so that these somewhat resemble the eraser on a pencil reduced to those dimensions. Thirty of these are stuck to the plastic-and-neoprene surface of the negative plate by means of a machine which spaces them symmetrically on the surface of the plate. The adhesive used to stick them is the same solution used on the plates, that is: a mixture of equal parts of polystyrene and neoprene dissolved in xylol.
(10) A roller impregnated in the same solution is passed over the ends of the rubbers that have been thus stuck, and a positive plate is stuck to them.
(11) The plate that has been coated in this manner with a thin tenacious film is placed in a machine which showers upon it numberless "brush" discharges of electricity at a voltage of 15,000 v. and an intensity of 5 milliamperes. These discharges produce a plurality of perforations of the order of some 150,000 perforations per square centimeter without in any way damaging the film or the friable material of which the plate is formed.

I claim:

1. A porous accumulator plate comprising a grid, porous electrochemically active ingredients on said grid, said active ingredients being impregnated with a binder film of electrochemically inert and electrically insulating material, said plate characterized by the said binder film being perforated by high tension discharges between the surface of said active ingredients and said grid, said binder being resistant to the chemical action of the electrolyte and a plurality of spaced projections of said binder film on said plate to maintain a predetermined distance between positive and negative plates.

2. A plate as described in claim 1, wherein said projections are made of a chemically stable elastomeric material to establish the distance between plates in such a manner that a group of plates so assembled will constitute an elastic whole.

3. A plate as in claim 1, in which said binding film covers the surface of the plate, but does not penetrate the entire thickness of the plate, and impregnates only the active material to be found near the surface.

References Cited by the Examiner

UNITED STATES PATENTS

| | | | |
|---|---|---|---|
| 2,738,375 | 3/56 | Schlotter | 136—30 |
| 2,838,590 | 6/58 | Garine. | |
| 3,129,118 | 4/64 | Wilke et al. | |

JOHN H. MACK, *Primary Examiner.*